United States Patent
Ananthanarayanan et al.

(10) Patent No.: US 6,717,091 B2
(45) Date of Patent: Apr. 6, 2004

(54) METHOD FOR METALLURGICALLY ATTACHING TOGETHER TWO TUBES

(75) Inventors: Venkatasubramanian Ananthanarayanan, Beavercreek, OH (US); Dharmendra M. Ramachandra, Centerville, OH (US); Johnny R. Gentry, Kettering, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/225,751

(22) Filed: Aug. 22, 2002

(65) Prior Publication Data

US 2004/0035830 A1 Feb. 26, 2004

(51) Int. Cl.⁷ .............................................. B23K 11/00
(52) U.S. Cl. .................................... 219/59.1; 219/78.16
(58) Field of Search ............................ 219/59.1, 61.11, 219/78.01, 78.16, 101, 102, 104, 117.1

(56) References Cited

U.S. PATENT DOCUMENTS 4,676,427 A * 6/1987 Constance .................. 228/189

6,552,294 B1 * 4/2003 Ananthanarayanan et al. ... 219/107

FOREIGN PATENT DOCUMENTS

DE    28 06 287 A1 *  8/1979 .......... B23K/31/06
JP    55-136584 A   * 10/1980 .......... B23K/11/32

* cited by examiner

Primary Examiner—M. Alexandra Elve
Assistant Examiner—Kevin P. Kerns
(74) Attorney, Agent, or Firm—Scott A. McBain

(57) ABSTRACT

A method for metallurgically attaching together two tubes. A first tube is obtained having a far wall portion with a first through hole and a near wall portion with a second through hole. A second tube is obtained including first and second outward folds. The tubes are positioned with the first fold passed through the second through hole and contacting the far wall portion surrounding the first through hole and with the second fold located outside the near wall portion. A first resistance welding current path is created proximate the first fold and the far wall portion and the first fold is relatively moved deformingly against the far wall portion creating a first weld zone. A second resistance welding current path is created proximate the second fold and the near wall portion and the second fold is relatively moved deformingly against the near wall portion creating a second weld zone.

20 Claims, 4 Drawing Sheets

METHOD FOR METALLURGICALLY ATTACHING TOGETHER TWO TUBES

TECHNICAL FIELD

The present invention relates generally to metallurgy, and more particularly to a method for metallurgically attaching together two tubes.

BACKGROUND OF THE INVENTION

Resistance welding (also known as electric-resistance welding) is a known metallurgical process wherein metal is heated by its own resistance to a semi-fused (i.e., soft) or fused (i.e., molten) state by the passage of very heavy electric currents for very short lengths of time and then welded by the application of pressure.

Conventional methods for attaching parts together include gas metal arc welding. Gas metal arc welding uses a consumable metal wire as one electrode and the parts as another electrode, and moves the consumable metal wire (or the parts) to draw an arc and weld the parts together. The welding is accompanied by a gas (such as a mixture of argon and carbon dioxide) to prevent oxidation and stabilize the arc. Such gas metal arc welding is well known. In a conventional gas metal arc welding technique, solid metal wire or metal core wire (i.e., an annular-solid wire whose core is filled with metal powder such as a mixture of metal, alloy and/or oxide powders) is used with the wire at a positive electrical welding potential and with the parts electrically grounded. The welding arc creates a molten weld puddle which results in the welding together of the parts. A ceramic ferrule is used to contain the weld puddle when needed. Gas metal arc welding requires expensive welding equipment, the molten weld puddle tends to flow away from the joint area resulting in welds of inconsistent quality, and the process requires a long cycle time between welds.

Conventional methods for attaching parts together also include friction welding. To join two tubes together end to end, one of the tubes is rotated about its longitudinal axis, and the tube ends are pressed together, wherein friction causes heating of the ends creating the weld. To join a tube to a plate, the tube is rotated about its longitudinal axis, and the tube end and the plate are pressed together, wherein friction causes heating creating the weld. Friction welding requires expensive welding equipment, and the process requires a long cycle time between welds.

Expensive fasteners, used for attaching a member to a tube, are known which penetrate the near and far wall portions of the tube, which have a varying cross-section, shoulders, flanges, etc. to keep the near and far wall portions from collapsing, and which are arc/projection welded at both the near and far wall portions to prevent relative motion.

What is needed is a less expensive method for metallurgically attaching together two tubes.

SUMMARY OF THE INVENTION

A first method of the invention is for metallurgically attaching together two tubes and includes steps a) through e). Step a) includes obtaining a first tube having a far wall portion with a first through hole and having a near wall portion with a second through hole. Step b) includes obtaining a second tube including a first wall portion having a first outward fold with spaced-apart first and second fold portions and including a second wall portion having a second outward fold with spaced-apart third and fourth fold portions. Step c) includes, after steps a) and b), positioning the first and second tubes with the first outward fold passed through the second through hole and contacting the far wall portion surrounding the first through hole and with the second outward fold located outside the near wall portion. Step d) includes, after step c), creating a first resistance welding current path through the first and second tubes proximate the first outward fold and the far wall portion and relatively moving the first outward fold deformingly against the far wall portion creating a first weld zone which includes at least some of the first outward fold and at least some of the far wall portion. Step e) includes, after step d), creating a second resistance welding current path through the first and second tubes proximate the second outward fold and the near wall portion and relatively moving the second outward fold deformingly against the near wall portion creating a second weld zone which includes at least some of the second outward fold and at least some of the near wall portion.

Several benefits and advantages are derived from the first method of the invention. Resistance welding is less expensive than gas metal arc welding or friction welding. Resistance welding also has a shorter cycle time between welds than gas metal arc welding or friction welding. When the second tube is a short tube having one end flush with the far wall portion and having another end flush with the near wall portion, the second tube functions as a tube stiffener for the first tube. This allows an inexpensive fastener to pass through the second tube, as can be appreciated by the artisan.

DESCRIPTION OF THE PREFERRED EMBODIMENTS

Figure 1:
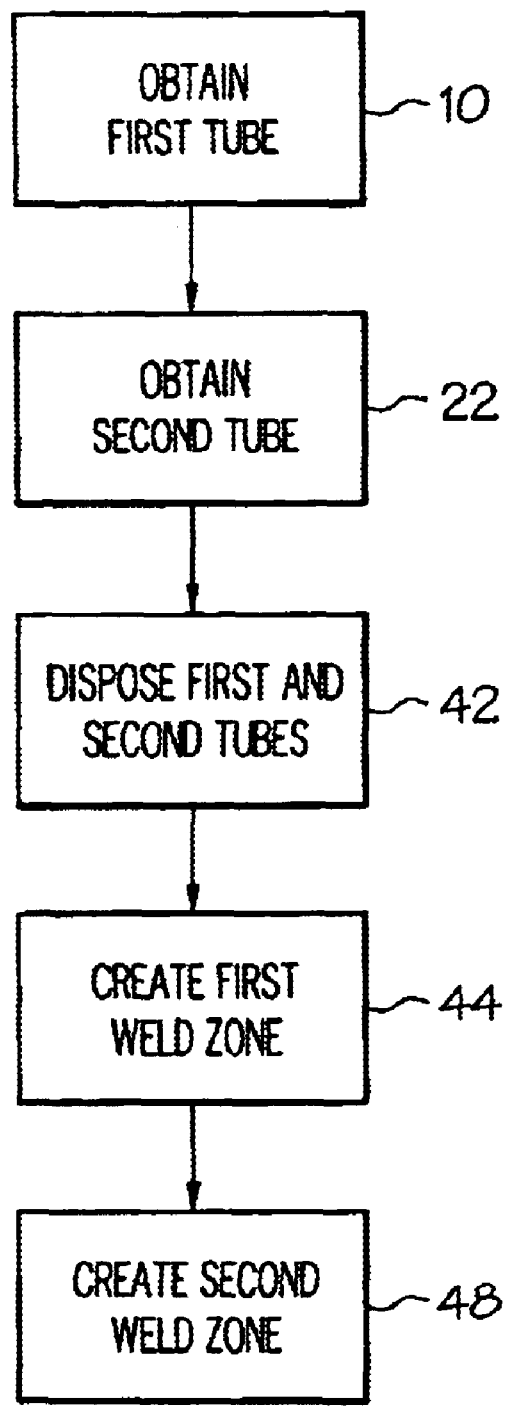
FIG. 1 is a block diagram of the first method of the invention for metallurgically attaching together two tubes.
Figure 2:
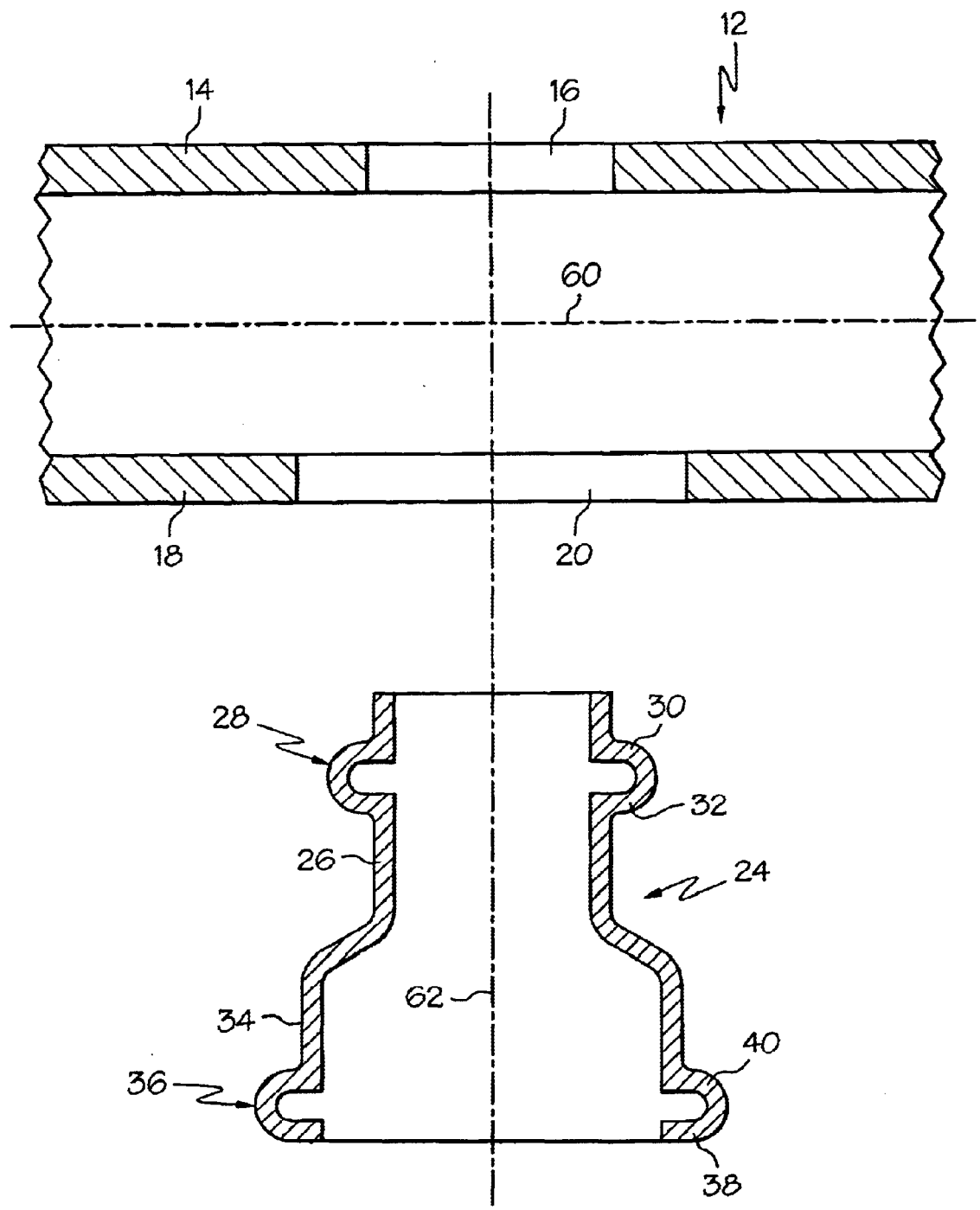
FIG. 2 is a schematic, side cross-sectional view of a first embodiment of first and second tubes used in the first method showing the two tubes before being brought together for welding.
Figure 3:
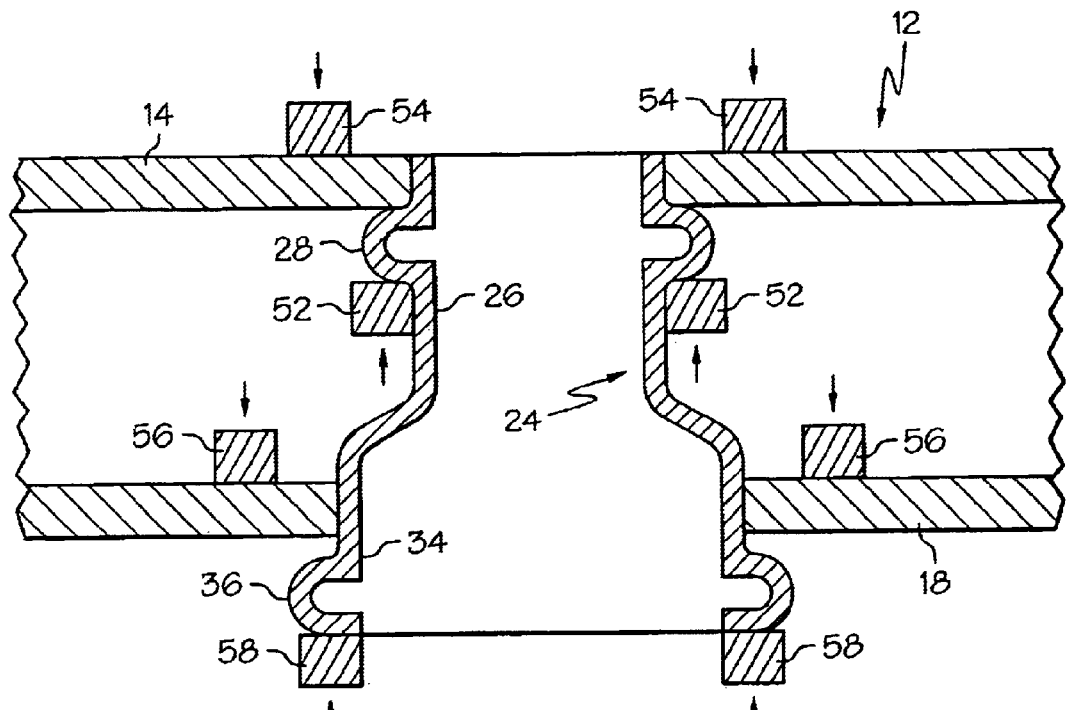
FIG. 3 is a view, as in FIG. 2, but showing the two tubes brought together for resistance welding and also showing the locations of the welding electrodes used for the resistance welding.
Figure 4:
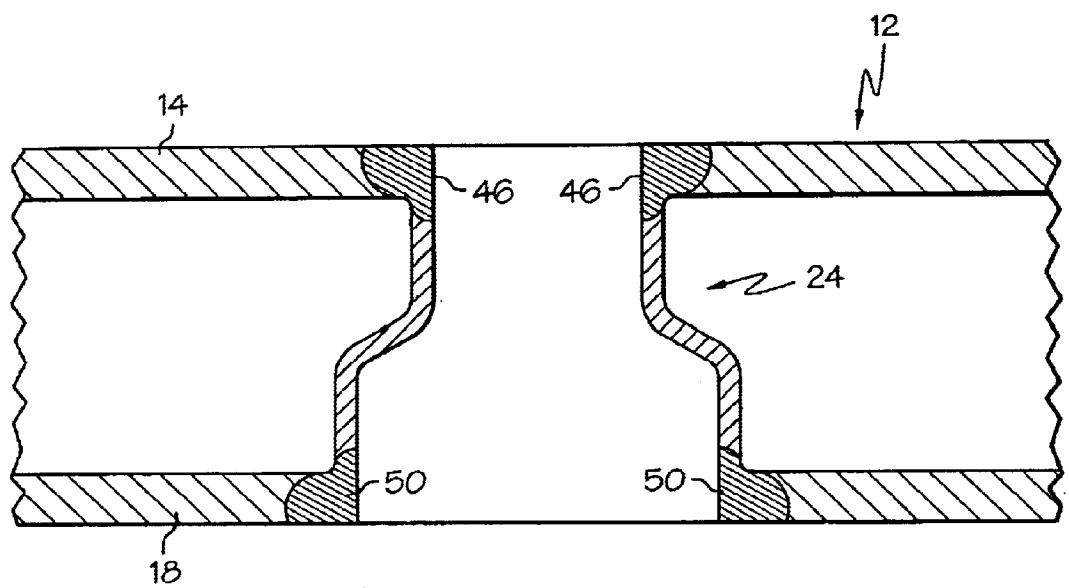
FIG. 4 is a view, as in FIG. 3, but showing the metallurgically attached together tubes with the welding electrodes removed.

A first method of the invention is for metallurgically attaching together two tubes and is shown in FIGS. 1–4. The first method includes steps a) through e). Step a) is labeled as "Obtain First Tube" in block 10 of FIG. 1. Step a) includes obtaining a first tube 12 having a far wall portion 14 with a first through hole 16 and having a near wall portion 18 with a second through hole 20. Step b) is labeled as "Obtain Second Tube" in block 22 of FIG. 1. Step b) includes obtaining a second tube 24 including a first wall portion 26 having a first outward fold 28 with spaced-apart first and second fold portions 30 and 32 and including a second wall portion 34 having a second outward fold 36 with spaced-apart third and fourth fold portions 38 and 40. Step c) is labeled as "Dispose First and Second Tubes" in block 42 of FIG. 1. Step c) includes, after steps a) and b), disposing the first and second tubes 12 and 24 with the first outward fold 28 passed through the second through hole 20 and contacting the far wall portion 14 surrounding the first through hole 16 and with the second outward fold 36 disposed outside the near wall portion 18. Step d) is labeled as "Create First Weld Zone" in block 44 of FIG. 1. Step d) includes, after step c), creating a first resistance welding current path through the first and second tubes 12 and 24 proximate the first outward fold 28 and the far wall portion 14 and relatively moving the first outward fold 28 deformingly against the far wall portion 14 creating a first weld zone 46 which includes at least some of the first outward fold 28 and at least some of the far wall portion 14. Step e) is labeled as "Create Second Weld Zone" in block 48 of FIG. 1. Step e) includes, after step d), creating a second resistance welding current path through the first and second tubes 12 and 24 proximate the second outward fold 36 and the near wall portion 18 and relatively moving the second outward fold 36 deformingly against the near wall portion 18 creating a second weld zone 50 which includes at least some of the second outward fold 36 and at least some of the near wall portion 18.

The term "proximate" includes, without limitation, the term "at". By "relatively moving" is meant moving an outward fold with the wall portion stationary or moving the wall portion with the outward fold stationary or moving both the outward fold and the wall portion, as is within the level of skill of the artisan.

In one application of the first method, such relative movement squeezes out surface contaminants from between an outward fold and the corresponding far or near wall portion and such relative movement levels the hills and valleys between the contacting surfaces of that outward fold and that wall portion to bring surface atoms of that outward fold within atomic bonding distances with surface atoms of that wall portion. In one implementation of the first method, steps d) and e) do not melt any of the first and second outward folds and do not melt any of the far and near wall portions. In another implementation, steps d) and e) melt at least some of the first and second outward folds or at least some of the far and near wall portions or melt at least some of the first and second outward folds and at least-some of the far and near wall portions.

In one embodiment of the first method, the first tube 12 (and/or the second tube 24) has an annular substantially-rectangular cross section. In a different embodiment, the first tube 12 (and/or the second tube 24) has an annular substantially-circular cross section. Other shapes for the first tube 12 (and for the second tube 24) are left to the artisan.

In one example of the first method, the first and second through holes 16 and 20 are substantially-rectangular through holes. In one modification, the first and second outward folds 28 and 36 each have an annular substantially-rectangular cross section. In another example, the first and second through holes 16 and 20 are substantially-circular through holes. In another modification, the first and second outward folds 28 and 36 each have an annular substantially-circular cross section. Other shaped first and second through holes 16 and 20, other shaped cross-sections of the first and second outward folds 28 and 36, and non-annular fold shapes for the first and second outward folds 28 and 36 are left to the artisan.

In one performance of the first method, the first and second weld zones 46 and 50 are substantially-annular weld zones. In one variation, the first and second weld zones 46 and 50 are (completely) annular weld zones. Examples of non-annular weld zones are left to those skilled in the art.

In a first application of the first method, the first and second wall portions 26 and 34 each are end wall portions.

Figure 5:
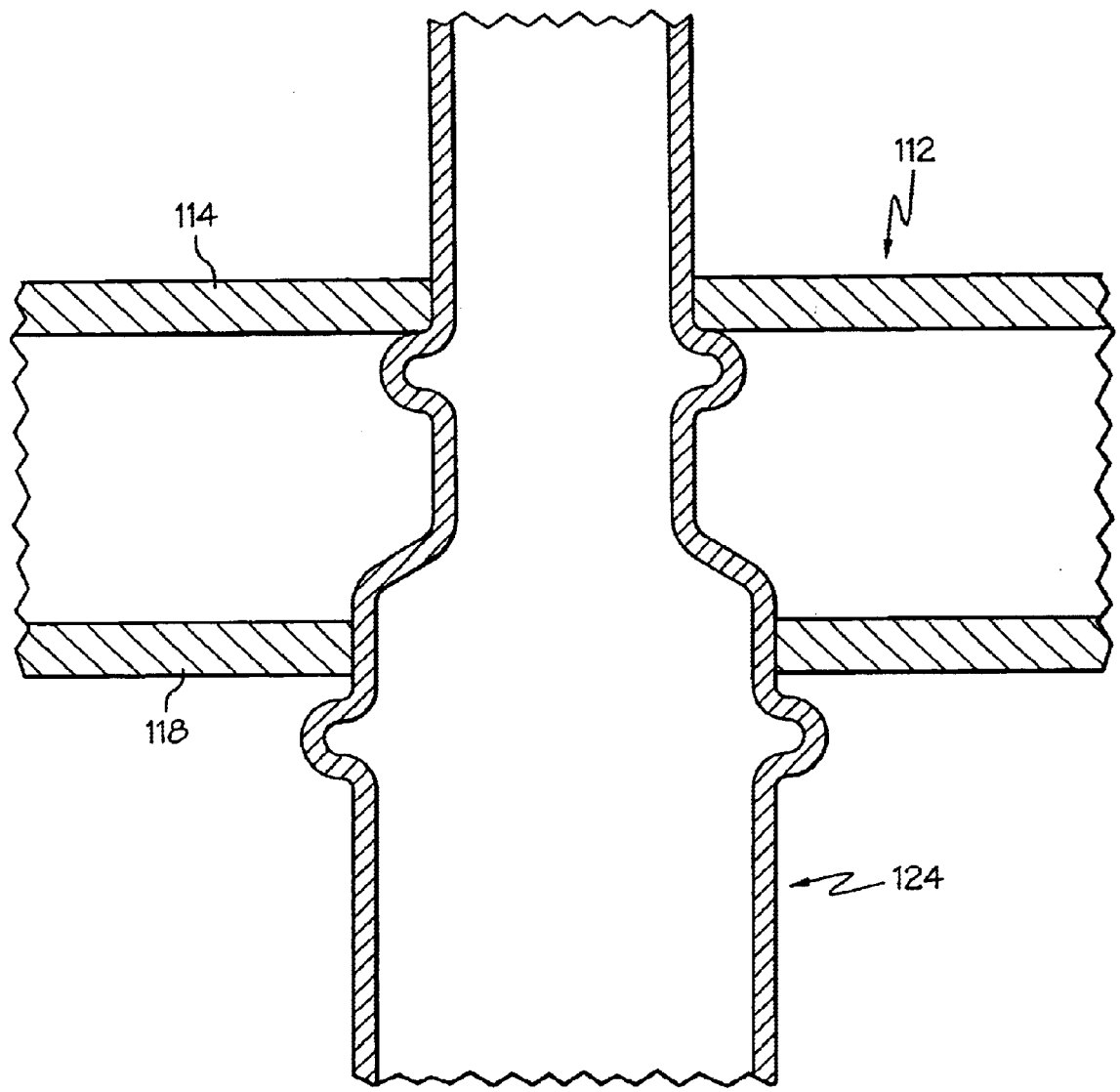
FIG. 5 is a view, as in FIG. 3, but showing a different tube embodiment and omitting the welding electrodes.

In one example of the first application of the first method, after step d) one end of the second tube 24 is substantially flush with the outside of the far wall portion 14, and after step e) the other end of the second tube 24 is substantially flush with the outside of the near wall portion 18. In a second application of the first method, shown in the different tube embodiment of FIG. 5 corresponding to step c) of the first method, the second tube 124 is longer than in the first application. In one example of the second application, after step e), the second tube 124 substantially extends outside at least one of the far and near wall portions 114 and 118. In one modification, the one end of the second tube 124 extends outside the first tube 112 beyond the far wall portion 114 and the other end of the second tube 124 extends outside the first tube 112 beyond the near wall portion 118.

In one implementation of the first method, step d) uses a resistance-welding first inside electrode 52 disposed inside the first tube 12 and contacting the first outward fold 28, and step d) uses a resistance-welding first outside electrode 54 disposed outside the first tube 12 and contacting the far wall portion 14 proximate the first through hole 16. In the same or a different implementation, step e) uses a resistance-welding second inside electrode 56 disposed inside the first tube 12 and contacting the near wall portion 18 proximate the second through hole 20, and step e) uses a resistance-welding second outside electrode 58 disposed outside the first tube 12 and contacting the near wall portion 18 proximate the second through hole 20. Unnumbered arrows indicate the direction of relative movement of the electrodes. Other arrangements of electrodes are left to the artisan.

In one enablement of the first method, the second outward fold 36 contacts the near wall portion 18 at the completion of step d). In the same or a different enablement, step d) does not melt any of the first outward fold 28 and does not melt any of the far wall portion 14, and step e) does not melt any of the second outward fold 36 and does not melt any of the near wall portion 18.

In one execution of the first method, the first tube 12 has a first longitudinal axis 60, the second tube 24 has a second longitudinal axis 62, and step c) disposes the first and second tubes 12 and 24 with the second longitudinal axis 62 substantially perpendicular to the first longitudinal axis 60. In the same or a different execution of the first method, the first and second through holes 16 and 20 are coaxially aligned with each other and are aligned substantially perpendicular to the first longitudinal axis 60.

In one construction, the second wall portion 34 has a larger outside perimeter than the first wall portion 26. In one variation, when the second tube 24 has a substantially-circular cross-section, the outside diameter of the second wall portion 34 is larger than the outside diameter of the first wall portion 26. In one modification, when the first and second through holes 16 and 20 are substantially circular, the outside diameter of the first wall portion 26 (apart from the first outward fold 28) is slightly smaller than the diameter of the first through hole 16 [to allow for engagement in step c)], and the outside diameter of the second wall portion 34 (apart from the second outward fold 36) is slightly smaller than the diameter of the second through hole 20 [to allow for engagement in step c)].

A second method of the invention is for metallurgically attaching together two tubes and includes steps a) through e). Step a) includes obtaining a first tube having a first longitudinal axis, and having an annularly-cylindrical first wall including a far wall portion having a first through hole and a near wall portion having a second through hole. The first and second through holes are coaxially-aligned with each other and are aligned substantially perpendicular to the first longitudinal axis. The second through hole has a larger cross-sectional area than the first through hole.

Step b) of the second method includes obtaining a second tube having a second longitudinal axis, having an annularly-cylindrical second wall including a smaller-outside-perimeter first wall portion having an annular first outward fold substantially coaxially aligned with the second longitudinal axis and including a larger-outside-perimeter second wall portion having an annular second outward fold substantially coaxially aligned with the second longitudinal axis. The first outward fold has longitudinally-spaced-apart first and second fold portions. The second outward fold has longitudinally-spaced-apart third and fourth fold portions.

Step c) of the second method includes, after steps a) and b), disposing the first and second tubes. The second longitudinal axis is coaxially aligned with the first and second through holes. The first wall portion is passed through the second through hole and extends into the first through hole. The first outward fold is disposed inside the first tube contacting the far wall portion surrounding the first through hole. The second wall portion extends into the second through hole. The second outward fold is disposed outside the first tube proximate the near wall portion.

Step d) includes, after step c), creating a first resistance welding current path through the first and second tubes proximate the first outward fold and the far wall portion and relatively longitudinally moving the first outward fold deformingly against the far wall portion creating an annular first weld zone. The first weld zone includes at least some of the first outward fold and at least some of the far wall portion. The relative movement brings the second outward fold into contact with the outside of the near wall portion.

Step e) includes, after step d), creating a second resistance welding current path through the first and second tubes proximate the second outward fold and the near wall portion and relatively longitudinally moving the second outward fold deformingly against the near wall portion creating an annular second weld zone. The second weld zone includes at least some of the second outward fold and at least some of the near wall portion. In one variation, the first and second tubes each have an annular substantially-circular cross section. In another variation, the first and second tubes each have an annular substantially-rectangular cross section.

In one choice of materials for the first and/or second method, the first and second tubes 12 and 24 comprise low carbon steel such as AISI 1008 to 1010 having a thickness of generally 2 millimeters with outward folds of the second tube projecting outward generally 2 millimeters. In one execution, pulses (totaling ⅓ of a second) of electric current of generally 5,000 amperes (and in one variation 15,000 to 20,000 amperes) are applied while applying a force of generally 300 to 800 pounds to the electrodes. The first and/or second method is not limited to specific materials, dimensions, electric current, and forces, as is understood by those skilled in the art. Any weldable materials such as copper, aluminum alloy, stainless steel, etc. can be used, as can be appreciated by the artisan. The particular choice of electric current, forces, and part dimensions, etc. are within the ordinary level of skill of the artisan.

In one design for the first and/or second method, the previously-discussed electrodes are annular an are installed in "T"-shaped electrode holders of a resistance welding machine (not shown). In one example, not shown, each electrode is formed from two sections which are brought together around the second tube and engages the second tube or are brought together around a through hole and engage corresponding far or near wall portion of the first tube. The electrode sections have surfaces generally corresponding to the shape of the engaged portion of that tube. The electrode sections are attached together before installing the electrode in the corresponding upper or lower one of the "T"-shaped electrode holders of the resistance welding machine.

Several benefits and advantages are derived from the first and/or second method of the invention. Resistance welding is less expensive than gas metal arc welding or friction welding. Resistance welding also has a shorter cycle time between welds than gas metal arc welding or friction welding. When the second tube is a short tube having one end flush with the far wall portion and having another end flush with the near wall portion, the second tube functions as a tube stiffener for the first tube. This allows an inexpensive fastener to pass through the second tube, as can be appreciated by the artisan.

The foregoing description of a several methods of the invention has been presented for purposes of illustration. It is not intended to be exhaustive or to limit the invention to the precise procedures or precise forms disclosed, and obviously many modifications and variations are possible in light of the above teaching. It is intended that the scope of the invention be defined by the claims appended hereto.

What is claimed is:

1. A method for metallurgically attaching together two tubes comprising the steps of:
   a) obtaining a first tube having a far wall portion with a first through hole and having a near wall portion with a second through hole;
   b) obtaining a second tube including a first wall portion having a first outward fold with spaced-apart first and second fold portions and including a second wall portion having a second outward fold with spaced-apart third and fourth fold portions;
   c) after steps a) and b), disposing the first and second tubes with the first outward fold passed through the second through hole and contacting the far wall portion surrounding the first through hole and with the second outward fold disposed outside the near wall portion;
   d) after step c), creating a first resistance welding current path through the first and second tubes proximate the first outward fold and the far wall portion and relatively moving the first outward fold deformingly against the far wall portion creating a first weld zone which includes at least some of the first outward fold and at least some of the far wall portion; and
   e) after step d), creating a second resistance welding current path through the first and second tubes proximate the second outward fold and the near wall portion and relatively moving the second outward fold deformingly against the near wall portion creating a second weld zone which includes at least some of the second outward fold and at least some of the near wall portion.

2. The method of claim 1, wherein the first tube has an annular substantially-rectangular cross section.

3. The method of claim 1, wherein the first tube has an annular substantially-circular cross section.

4. The method of claim 1, wherein the first and second through holes are substantially-rectangular through holes.

5. The method of claim 4, wherein the first and second outward folds each have an annular substantially-rectangular cross section.

6. The method of claim 1, wherein the first and second through holes are substantially-circular through holes.

7. The method of claim 6, wherein the first and second outward folds each have an annular substantially-circular cross section.

8. The method of claim 1, wherein the first and second weld zones are annular weld zones.

9. The method of claim 1, wherein the first and second wall portions each are end wall portions, wherein after step d) one end of the second tube is substantially flush with the outside of the far wall portion, and wherein after step e) the other end of the second tube is substantially flush with the outside of the near wall portion.

10. The method of claim 1, wherein, after step e), the second tube substantially extends outside at least one of the far and near wall portions.

11. The method of claim 1, wherein step d) uses a resistance-welding first inside electrode disposed inside the first tube and contacting the first outward fold, and wherein step d) uses a resistance-welding first outside electrode disposed outside the first tube and contacting the far wall portion proximate the first through hole.

12. The method of claim 1, wherein step e) uses a resistance-welding second inside electrode disposed inside the first tube and contacting the near wall portion proximate the second through hole, and wherein step e) uses a resistance-welding second outside electrode disposed outside the first tube and contacting the near wall portion proximate the second through hole.

13. The method of claim 1, wherein the second outward fold contacts the near wall portion at the completion of step d).

14. The method of claim 1, wherein step d) does not melt any of the first outward fold and does not melt any of the far wall portion, and wherein step e) does not melt any of the second outward fold and does not melt any of the near wall portion.

15. The method of claim 1, wherein the first tube has a first longitudinal axis, wherein the second tube has a second longitudinal axis, and wherein step c) disposes the first and second tubes with the second longitudinal axis substantially perpendicular to the first longitudinal axis.

16. The method of claim 1, wherein the first and second through holes are coaxially aligned with each other and are aligned substantially perpendicular to the first longitudinal axis.

17. The method of claim 1, wherein the second wall portion has a larger outside perimeter than the first wall portion.

18. A method for metallurgically attaching together two tubes comprising the steps of:
   a) obtaining a first tube having a first longitudinal axis, and having an annularly-cylindrical first wall including a far wall portion having a first through hole and a near wall portion having a second through hole, wherein the first and second through holes are coaxially-aligned with each other and are aligned substantially perpendicular to the first longitudinal axis, and wherein the second through hole has a larger cross-sectional area than the first through hole;
   b) obtaining a second tube having a second longitudinal axis, having an annularly-cylindrical second wall including a smaller-outside-perimeter first wall portion having an annular first outward fold substantially coaxially aligned with the second longitudinal axis and including a larger-outside-perimeter second wall portion having an annular second outward fold substantially coaxially aligned with the second longitudinal axis, wherein the first outward fold has longitudinally-spaced-apart first and second fold portions, and wherein the second outward fold has longitudinally-spaced-apart third and fourth fold portions;
   c) after steps a) and b), disposing the first and second tubes with the second longitudinal axis coaxially aligned with the first and second through holes, with the first wall portion passed through the second through hole and extending into the first through hole, with the first outward fold disposed inside the first tube contacting the far wall portion surrounding the first through hole, with the second wall portion extending into the second through hole, and with the second outward fold disposed outside the first tube proximate the near wall portion;
   d) after step c), creating a first resistance welding current path through the first and second tubes proximate the first outward fold and the far wall portion and relatively longitudinally moving the first outward fold deformingly against the far wall portion creating an annular first weld zone which includes at least some of the first outward fold and at least some of the far wall portion, wherein the relative movement brings the second outward fold into contact with the outside of the near wall portion; and
   e) after step d), creating a second resistance welding current path through the first and second tubes proximate the second outward fold and the near wall portion and relatively moving the second outward fold deformingly against the near wall portion creating an annular second weld zone which includes at least some of the second outward fold and at least some of the near wall portion.

19. The method of claim 18, wherein the first and second tubes each have an annular substantially-circular cross section.

20. The method of claim 19, wherein the first and second tubes each have an annular substantially-rectangular cross section.

* * * * *